US008560948B2

(12) United States Patent
Hu

(10) Patent No.: US 8,560,948 B2
(45) Date of Patent: Oct. 15, 2013

(54) USER SUPPORT SYSTEM INTEGRATING FAQ AND HELPDESK FEATURES AND FAQ MAINTENANCE CAPABILITIES

(76) Inventor: Michael Hu, Cumberland (CA)

(*) Notice: Subject to any disclaimer, the term of this patent is extended or adjusted under 35 U.S.C. 154(b) by 1116 days.

(21) Appl. No.: 12/332,893

(22) Filed: Dec. 11, 2008

(65) Prior Publication Data
US 2009/0100371 A1  Apr. 16, 2009

Related U.S. Application Data

(63) Continuation-in-part of application No. 11/317,773, filed on Dec. 23, 2005.

(51) Int. Cl.
*G06F 17/00* (2006.01)
(52) U.S. Cl.
USPC ........................................................ 715/705
(58) Field of Classification Search
USPC .................................................. 715/911, 705
See application file for complete search history.

(56) References Cited

U.S. PATENT DOCUMENTS

| 5,581,686 | A | 12/1996 | Koppolu et al. | |
|---|---|---|---|---|
| 6,999,990 | B1 | 2/2006 | Sullivan et al. | |
| 7,418,437 | B1* | 8/2008 | Marks | 1/1 |
| 2001/0032211 | A1 | 10/2001 | Kuzumaki | |
| 2003/0004909 | A1* | 1/2003 | Chauhan et al. | 706/45 |
| 2006/0206818 | A1* | 9/2006 | Utter et al. | 715/705 |
| 2007/0150812 | A1* | 6/2007 | Hu | 715/705 |

OTHER PUBLICATIONS

Xara Online, "Feedback Form", http://www.xaraonline.com/home/application/ffp_home.htm; Copyright Date: Dec. 7, 2004; relevant pages: The entire document (3 pages total).

* cited by examiner

*Primary Examiner* — Doug Hutton, Jr.
*Assistant Examiner* — Andrew McIntosh
(74) *Attorney, Agent, or Firm* — Chen Yoshimura LLP

(57) ABSTRACT

A user support system provides a user interface that integrates FAQ features and helpdesk features and a user support request handling interface that integrates user support request handling and FAQ database maintenance. The user interface screen allows a user to select one or more levels of categories of support topic, and displays a list of frequently asked questions (FAQ) based on the user-selected categories. Once the categories are selected, a message input window is displayed on the user interface screen to allow the user to send a support request to the support provider. The user support request handling interface allows a support staff to select from a database a template answer to the user's request; it also provides means for the support staff to directly edit the template answer in the database, add new questions and answers to the database, or assign a question to a category.

8 Claims, 8 Drawing Sheets

Please select a category

| \*\*\* ALL \*\*\* |
|---|
| Sales, Group |
| Sales, Individual |
| Installation |
| How-to |

11

Subcategory

| \*\*\* All \*\*\* |
|---|
| Universities |
| Others |

12

Frequently Asked Questions:

13
1. How do I install this license code?
2. What is the difference between EazyPaper and EazyPaper Pro?
3. I have multiple user accounts on my computer. Can I install EazyPaper on all of them?

13a  A: Yes, the license allows you to use EazyPaper for all the user accounts on a single computer. The easiest way to do this is to install EazyPaper on an account that has administrator privileges. All users of the computer would then have access to the two day trial.

TOP

Can't find the answer? Enter your question here:

14

15a  Name: _____    15b  Email: _____

Operating System:  Windows XP

Word Processor:  Word 2003    15d

15c

[ Submit question ]

Fig. 1

Filter Issues for Active support

| All Statuses | All Users | | | |
|---|---|---|---|---|
| | | [Keyword Search] | | Return: 261 of 261 |

[Add Issue] [Delete Selected] [Print All Issues] [Prev] [Next] Showing 1 to 25 of 261 rows

| ID | Title | Status | Assigned to | Updated | |
|---|---|---|---|---|---|
| 1389 | Test question | Open | EazyPaper support | 10/13/2008 | ☐ |
| 1361 | Request | Waiting for Reply | Michael Hu | 10/13/2008 | ☐ |
| 1388 | problems with Eazy Papter | Open | EazyPaper support | 10/13/2008 | ☐ |
| 1387 | License Help | Open | EazyPaper support | 10/13/2008 | ☐ |
| 1386 | trouble buying license | Open | EazyPaper support | 10/13/2008 | ☐ |
| 1382 | Is the discount still applicable? | Open | EazyPaper support | 10/13/2008 | ☐ |
| 1369 | credit for purchase | Waiting for Reply | EazyPaper support | 10/13/2008 | ☐ |

Fig. 3

USER SUPPORT SYSTEM INTEGRATING FAQ AND HELPDESK FEATURES AND FAQ MAINTENANCE CAPABILITIES

BACKGROUND OF THE INVENTION

1. Field of the Invention

This invention relates to a user support system, and in particular, it relates to a user support system interface with integrated FAQ and helpdesk features and a user support system that integrates user support request handling and FAQ maintenance.

2. Description of the Related Art

Many websites have a FAQ (frequently asked questions) section to answer the most common customer questions. Many other websites have a helpdesk system where customers can send in their support questions and a technical support team will answer them, and track them by a server-generated ticket number. All the members of the technical support team can answer a given ticket because the entire thread is tracked by the ticket id, and thus the support load can be distributed among the entire technical support team.

Traditional FAQ systems are often frustrating to users when the FAQs do not contain the answer that the users are looking for. On the other hand, these FAQ systems tend to go out of date, since the support staff has little motivation to update these FAQs while they are swamped with fielding support requests.

Another issue with conventional user support operations is support staff training. Users can enter whatever question they want, which means support team members must know virtually everything about the product and provide answers that are consistent throughout the team. This makes training difficult, since new information and procedures about the product are constantly being generated, but that information does not always filter down to the first level support team members. A traditional solution to this problem is to have an internal database of answers which the support team members would copy and paste into their answers, and then modify them for the current users. This process can be cumbersome.

Another problem with the above system is that internal answers databases tend to get outdated and out of sync with the public FAQ database. This is because the team members who are handling the day to day support are often not the ones qualified to write template answers for an entire support system. These first line support team members know where the FAQ and internal answer database can be improved, but lack the ability, authority, or even desire to update them since they're often on a different system. On the other hand, senior support staff does not handle day to day support by definition (or if they do, this is very expensive to the company). They have the ability, but not the knowledge of what to update.

SUMMARY OF THE INVENTION

While many websites have a FAQ section and a helpdesk system, none appear to have an integrated FAQ and helpdesk system. When users look for support on a website, they may find the FAQ section first and browse it. If they cannot find the answer, they either give up, or do further searches for the helpdesk system or support email. This non-integrated approach to an FAQ and helpdesk system can be aggravating to a user. A worse case would be if the user skips the FAQ section or does not find it, and then generates a support request through the helpdesk system which is answered by the FAQ section. This non-integrated approach to an FAQ and helpdesk system generates unnecessary support requests, which increases the cost to the vendor and forces the user to wait for an answer.

The present invention provides an integrated FAQ and helpdesk system. The system reduces support requests by integrating the FAQ and helpdesk system in an easy to use manner.

The integrated FAQ and helpdesk system simplifies the support request handling process. When answering a user request, a support team member selects an appropriate question/title, and the system automatically inserts a template answer and customizes the answer for the user through template variables.

The integrated FAQ and helpdesk system also makes updating FAQs a natural part of the support handling process, without adding an extra burden to support team members.

The present invention is directed to a method of providing user support that substantially obviates one or more of the problems due to limitations and disadvantages of the related art.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides a method of providing user support through a user interface screen, including: displaying on the screen one or more menu windows for selecting one or more levels of support categories by a user; receiving a user selection of one or more levels of support categories; displaying on the screen a list of frequently asked questions based on a user selection of the support categories; and in response to receiving the user selection of the support categories, automatically displaying on the screen a message input window for entering questions by the user.

In another aspect, the present invention provides a method of handling user support requests using a support management interface display, which includes: (a) storing a database containing a plurality of questions and a corresponding plurality of answers; (b) receiving a user support request from a user; (c) displaying on a ticket handling screen of the support management interface a list of questions retrieved from the database; (d) receiving a selection of one of the displayed questions from a support staff; (e) generating a response to the user request based on an answer stored in the database corresponding to the selected question; (f) communicating the response to the user; (g) displaying on the ticket handling screen a first input means for entering a first database maintenance request; (h) in response to receiving the first database maintenance request, displaying a database maintenance screen of the support management interface, the database maintenance screen including a first area displaying the question selected in step (d) and a second area displaying the corresponding answer, the second area permitting the displayed answer to be edited; and (i) storing the edited answer in the database as the answer corresponding to the question.

In another aspect, the invention provides a method of handling user support requests using a support management interface display, which includes: (a) storing a database containing a plurality of questions and a corresponding plurality of answers, the database further containing, for each question, zero or more levels of support categories to which the question is assigned; (b) receiving a user support request from a user, which includes a user-inputted question and one or more levels of support categories selected by the user; (c) displaying on a ticket handling screen of the support management interface a list of questions retrieved from the database; (d) receiving a selection of one of the displayed questions from a support staff; (e) generating a response to the user request based on an answer stored in the database corresponding to the selected question; (f) communicating the response to the user; (g) storing statistical information associating the question selected by the support staff in step (d) with the one or more levels of support categories selected by the user in the user support request in step (b); (h) displaying on the ticket handling screen an input means for entering a database maintenance request; (i) in response to receiving the database maintenance request, displaying one or more lists of one or more levels support categories and a list of questions; (j) receiving, from the support staff, a selection of one or more levels of support categories displayed in step (i) and a selection of a question displayed in step (i); and (k) associating the selected question with the selected one or more levels of support categories.

It is to be understood that both the foregoing general description and the following detailed description are exemplary and explanatory and are intended to provide further explanation of the invention as claimed.

BRIEF DESCRIPTION OF THE DRAWINGS

FIG. 1 illustrates a user interface screen for a user support system according to an embodiment of the present invention.

FIG. 3 illustrates a summary screen of the support management interface.

DETAILED DESCRIPTION OF THE PREFERRED EMBODIMENTS

Figure 2A:
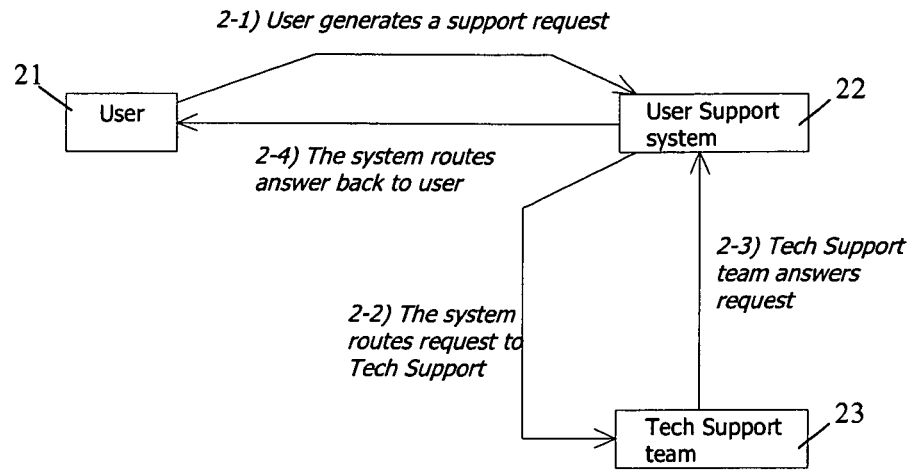
FIGS. 2a-2b illustrate the control flow for handling a support request according to an embodiment of the present invention.

FIG. 1 illustrates a user interface screen (e.g. a webpage displayed on a user's computer) for a user support system according to an embodiment of the present invention. The interface screen may be implemented as a part of a product vender's website to provide user support, which is reached when the user browses to a support page of the vendor. As shown in FIG. 1, the webpage 10 has a first menu window 11 that allows the user to select a main category of the support topic, and a second menu window 12 that allows the user to select a subcategory. The subcategories displayed in the window 12 are automatically generated and updated based on the support category selected by the user. Although two levels of categories (main category and subcategory), more levels of categories may be provided (in additional menu windows) if desired. Once the user selects the category and subcategory, a list of frequently asked questions (FAQ) 13 corresponding to the selected category and subcategory are automatically displayed on the screen. The user may then click on a question of interest, and the answer 13a to the selected question is displayed in response. The answer may displayed without refreshing the webpage, or it may be displayed by refreshing the webpage. The display may highlight the selected question to indicate the question being answered, or display the answer in a spatial relationship with the selected question (i.e. immediately below it) to indicate the question being answered. Clicking on the FAQ entry again hides the answer. Alternatively, answers to all questions may be displayed simultaneously on the screen, but this is less preferred as it tends to overcrowd the screen.

On the same screen, a message input window 14 is provided. Upon reviewing the FAQ and answers, if the user cannot find the solution he is looking for, he may submit his question to the vendor using the message input window 14. Additional windows 15a-d are also provided for the user to enter additional metadata about the support request, such as the users name and email address, the operating system and application program the user is using, a subject line of the question, etc. The items of metadata gathered are specified by the vendor, but at least the email address should be required in order for the vendor to communicate with the user. In the example shown in FIG. 1, additional windows 15c and 15d request the user to specify the operating system and application program or version (in this example, the version of the word processing application) he uses. If the user chooses an unsupported operating system or application program version, an error message may be displayed.

In an alternative embodiment, the webpage 10 initially only displays the FAQ items including the first menu window 11, the second menu window 12, the list of FAQs 13 and the answers 13a. The message input window 14 and additional input windows 15a-d are not initially displayed. Only after the user has clicked at least one category in the first menu window 11 and at least one subcategory in the second menu window 12, the message input window 14 and additional windows 15a-d are automatically displayed. This ensures that the user makes at least some effort to find an answer in the FAQ before he types in a message. This feature can significantly reduce user support requests, because some users tend to look for an empty box to type their question into and overlook the FAQs. Note that the message input window 14 and additional input windows 15a-d are automatically displayed and the user does not need to click a separate link to have them displayed.

Once the user clicks a "submit question" button to submit the question, the user support system generates a support request, and attaches the solicited metadata as well as the category and subcategory of the question to the support request. The system also generates a ticket id for the support request, and routes it to the assigned technical support team member based on the category and subcategory of the request. In one embodiment, the system automatically routes the support requests to particular support team members based on category/subcategory and the members' expertise. In another embodiment, all the support requests may be placed in a common repository in which all support team member respond to on a first come-first serve basis. If a particular support staff cannot answer the question, then he assigns (routes) it to another support team member.

Figure 2B:
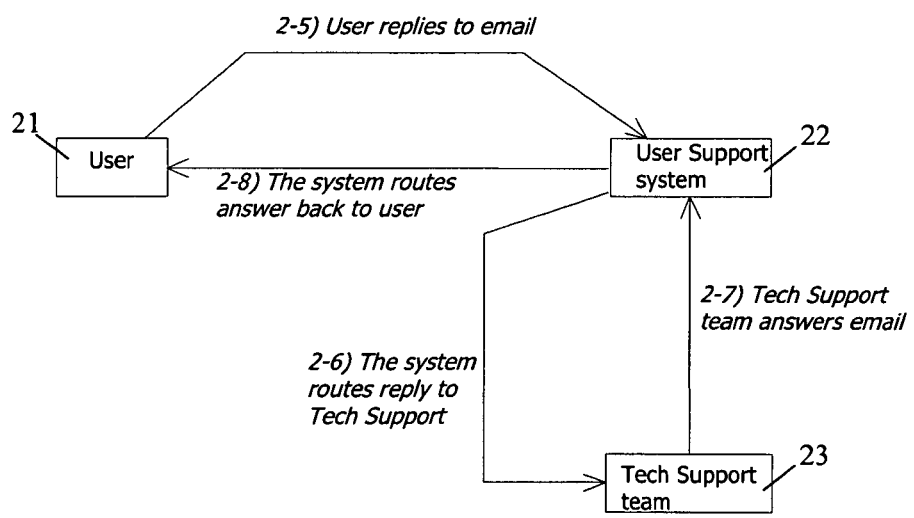

FIGS. 2a-2b illustrate the control flow for handling a support request. The process starts with the user 21 sending a support request to the user support system 22 (Step 2-1) using the interface shown in FIG. 1 and described above. The system 22 routes the support request to a technical support team member 23 (Step 2-2). The technical support team member answers the support request through a support management interface (Step 2-3). The support management interface is a part of the user support system that allows support team member to provide answers to users' questions and perform other support functions. It is a webpage hosted off the same server as the front-end user interface of the user support system, or a separate program that talks to a database of support tickets. The user support system associates the answer with the support request (as identified by the ticket id), and sends an email with the answer to the user and includes the ticket id in the subject line (Step 2-4).

Figure 4:
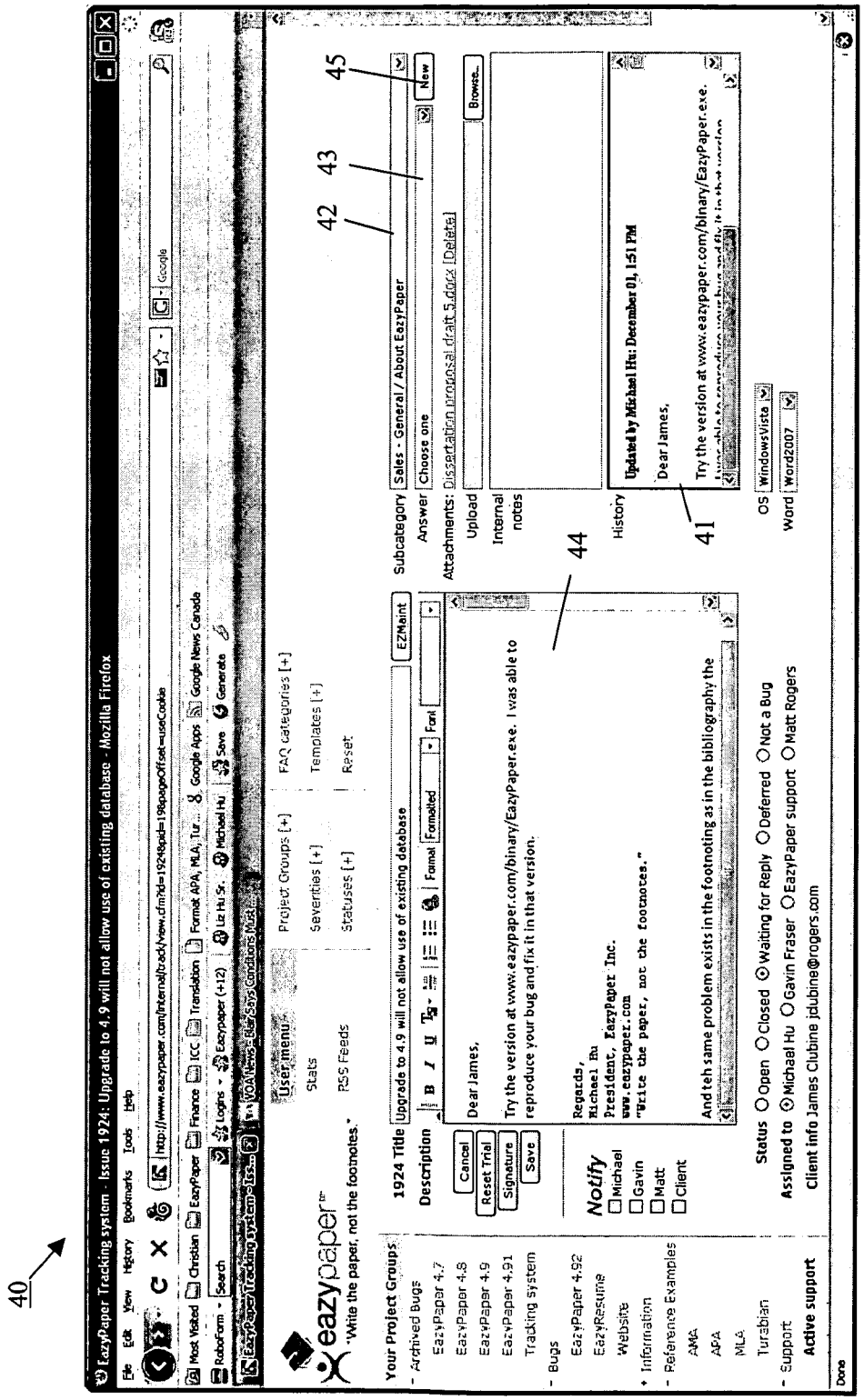
FIG. 4 illustrates a ticket handling screen of the support management interface.

The handling of the user support request is described in more detail with reference to FIGS. 3-4, which illustrate various display screens of the support management interface of the support system 22 for handling user support requests. As shown in FIG. 3, the support management interface has a summary screen 30 which displays support requests and their attributes such as ID, Title, Status (e.g. Open, Waiting for Reply, etc.), Assigned to (the support team member who is assigned the request), Updated (most recent date in which the support request has been touched), etc. The summary screen 30 allows support team members to filter and sort support request by their attributes; it may also have a generic 'Keyword search' that allows the support team members to search the ticket id, titles and contents of support requests for a keyword match.

The system initially assigns an "open" status to each ticket in Step 2-2, and its status is tracked and updated during the support request handling process. In Step 2-3, the support team member uses the summary screen 30 to select a ticket to handle. Once a ticket is selected, a ticket handling screen 40 of the support management interface, shown in FIG. 4, displays the details of the selected support request. The user's entered data, such as the support request's title, contents, category and subcategory, operating system, application program or version, etc., which the user has selected or typed in using the user interface screen (webpage) 10, is displayed and editable on the ticket handling screen 40.

Optionally, the ticket handling screen 40 may allow the support team member to see the user's purchase and license history. For example, the system may store a database of user ids or emails of users who have purchased or licensed a product for which the support is sought, and looks up the database to determine whether the current user has purchased or licensed the product.

On the ticket handling screen 40, the support team member can add internal notes (which will be displayed on the ticket handling screen 40 but not communicated to the user), assign the support request to another support team member, or perform other tasks. A history area 41 of the ticket handling screen 40 is read-only, and keeps a running history of every email, reply, and internal note that is associated with this support request. Relevant contents are added to the history area automatically.

Using ticket handling screen 40, the support team member answers the support request and uploads any desired attachments to aid the user in visualizing the answer to the support request. A preferred way of answering a support request is to read the user's request, and then choose a subcategory and select a template answer to that request. In the example of FIG. 4, the ticket handling screen 40 has a subcategory selection field 42 and an answer selection field 43. The subcategories and lists of answers stored in the support system 22 are a superset of the public list of FAQs shown in the user interface 10 of FIG. 1 and are stored in a knowledge database. When the support team member clicks the drop-down arrow in the answer selection field 43, a list of questions is displayed; a preview of the corresponding answers may also be displayed, for example, by hovering the cursor over a question. When a question is clicked, the system inserts the contents of the corresponding template answer into a response field 44 of the ticket handling screen 40.

In one implementation, each question in the knowledge database has either an internal answer or a public answer or both. The public answers correspond to the FAQ answers displayed to the user via the user interface screen 10. The internal answer are typically similar to the public answer but uses template variables so that user-specific information (such as client name, client email, client password) and global variable information (such as software version number) may be presented in the individual answers emailed to the users. When inserting an answer into the response field 44, the system inserts the internal answer if it exists, and inserts the public answer if an internal answer does not exist.

The system may also automatically insert a default greeting, such as the user's name, and a default signature from the support team member, in the response field 44. The support team member may make manual changes to the inserted template answer that he sees fit, including adding or changing template variables.

Of course, the support team member may also type an answer directly into the response field 44 without using the subcategory selection field 42 and the answer selection field 43. However, using the template answers provided by the subcategory selection field 42 and the answer selection field 43 has the advantage that a support team member can handle a user question even if the team member is not familiar with the detailed answer himself, and a single, consistent answer for a particular question can be given by all support team members.

Once the system transmits the answer to the user in Step 2-4, the status of the ticket is automatically changed to "Waiting for Reply".

Referring to FIG. 2b, after receiving the email with the answer from the user support system, the user 21 may reply to the email (Step 2-5). The reply will retain the subject line which includes the ticket id. An automated script of the support system 22 checks the email account of the reply address on a regular basis, reads the ticket id from the subject line, adds the user's reply to the ticket id's ongoing thread, and sets the state of the support request to "Open". The system may also notify the technical support team member 23 of the reply (Step 2-6). The technical support team member again answers the support request, assigns the support request to another (usually more senior) support team member, and/or adds internal notes to the support request that is not shared with the customer, etc., through the support management interface (Step 2-7). The system adds the reply to the ticket id, and sends an email with the answer to the user and includes the ticket id in the subject line (Step 2-8). Steps 2-5 to 2-8 are repeated until the issue is resolved, and a running history of customer questions, support team answers and internal notes are kept in the history are.

As an alternative or in addition to communicating with the user via email as illustrated in FIGS. 2a-2b, a technical support team member may also communicate with the user by telephone. In this case, the user interface will solicit the user's telephone number.

In a typical technical support operation, most support requests have been answered before, so re-using answers crafted by an expert increases the accuracy and relevancy of the answer, while decreasing the training time and costs for support engineers. As described above, the support system 22 implements such an approach by providing the subcategory selection field 42 and answer selection field 43 in the ticket handling screen 40, so that an appropriate template answer can be automatically inserted into the email to produce a specific answer responsive to the user support request.

Generating the answer this way has another advantage that it automatically correctly categorizes the user support requests so that more accurate statistics about the distribution of support requests can be obtained. Although the users have already categorized the questions when they submit the support requests, the users' categorization are not always reliable; therefore, generating statistics based on the users' categorization is also not reliable. In the above-described method, the support team members categorize the support requests as a part of the process of generating template answers for the user requests. Based on the support team members' categorization, the system automatically generates statistics about the distribution of support requests. The statistical data can be used to generate reports on a manual or automated basis as to where the majority of support requests lie. The statistical data can provide other useful information such as which versions of a program generates more support request, which can help a software developer decide where to put future development resources.

A process of creating and editing these template answers is described below with reference to FIGS. 4 and 5. As shown in FIG. 4, ticket handling screen 40 has a New/Edit button 45 located adjacent the answer selection field 43. If no answer is selected in the answer selection field 43, the button is displayed with a "New" label and a blank answer template is displayed when it is clicked. If an existing answer is selected in the answer selection field 43, the button 45 is displayed with an "Edit" label and the existing template answer text is displayed when the button is clicked. Optionally, the support system is designed so that the New/Edit button 45 is only displayed to senior support team members, or so that only senior support team members can add new question/answer entries.

Figure 5:
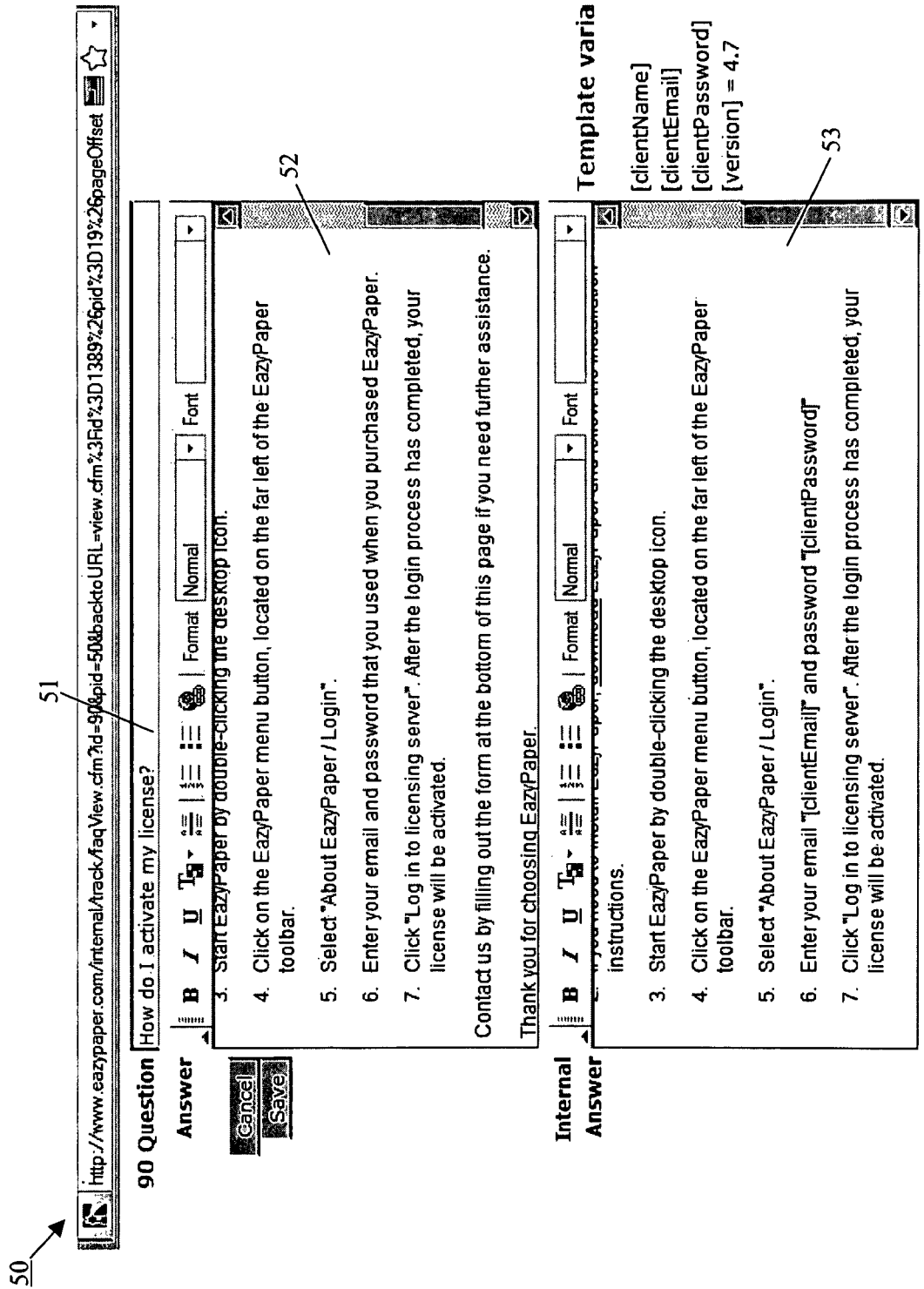
FIG. 5 illustrates a template answer editing screen of the support management interface.

FIG. 5 illustrates the template answer editing screen (also referred to as the FAQ database maintenance interface screen) 50 of the support management interface, which is displayed when the New/Edit button 45 is clicked. In the example shown in FIG. 5, the question field 51 is for displaying the question associated with the answer, and the answer field 52 and internal answer field 53 are for displaying the public answer and internal answer for the question, respectively. The question and the public answer may correspond to an entry of the FAQ visible to the user on the user interface screen 10. The internal answers typically differ from the public answers in that the internal answers include template variables. For instance, in the example shown in FIG. 5, paragraph 6 in the internal answer uses of the [clientEmail] and [clientPassword] template variables. When the internal answer is transmitted to the user by email, the system will replace the template variables with their values for the particular user.

Using the template answer editing screen 50, the support team member edits existing answers or creates new answers to questions, and saves the answers. When the answers are saved, the public answer (if it exists) will automatically become a part of the FAQ visible to the users on the user interface screen 10, and the internal answer is also stored but will not be visible to the user.

The template answer editing screen 50 may also allow the support team member to change the values of certain template variables. For example, the global value of the template variable [version] may be changed from "4.7" to "4.8" when a new version of the software is released.

The FAQ database is a unified database of external and internal answers, with a single management interface to update both (FIG. 5). Because the template answer editing screen 50 is easily accessed from the ticket handling screen 40 by clicking the New/Edit button 45, updating FAQs becomes a natural part of the support handing process without adding much extra burden to support team members. Thus, if users repeatedly ask a question that is not in the existing FAQ list, a senior support team member can use the template answer editing screen 50 to add it to the public FAQ list. For example, if a first line support team member encounters a user support request that the current system does not cover, he can assigns the support request to a senior support team member. Instead of writing an answer to that support request, the senior support engineer creates or edits a template answer, which may be an internal answer and/or a public answer. The first line support team member can then choose this template answer in handling future support requests, and users can find the answer to this question in the public FAQ database if a public answer is provided.

In addition, the support team engineer can change the category or subcategory of a question or assign a question to multiple categories or subcategories. Hierarchical FAQ systems often have the answers categorized in a different way than a user might categorize them; every user may categorize his world differently, and it is impossible to come up with a single hierarchical categorization that is perfect for every user. In the user support system, a question can be categorized under multiple categories or subcategories. Further, the category/subcategory assignment can be changed or added based on feedback from the user. For example, when a user picks a subcategory and generates a support request, it is a reflection of how the user would have categorized that question. The user support system gathers such information and stores it in a statistics database. If an existing question is consistently being asked under a particular "wrong" category/subcategory, the question can be assigned to that category/subcategory (in lieu of or in addition to the existing assignment), so that the answer is categorized in a way that users comprehend. Assigning a question to a category/subcategory can be accomplished in a number of ways, one of which is described with reference to FIGS. 6A-6C.

Figure 6A:
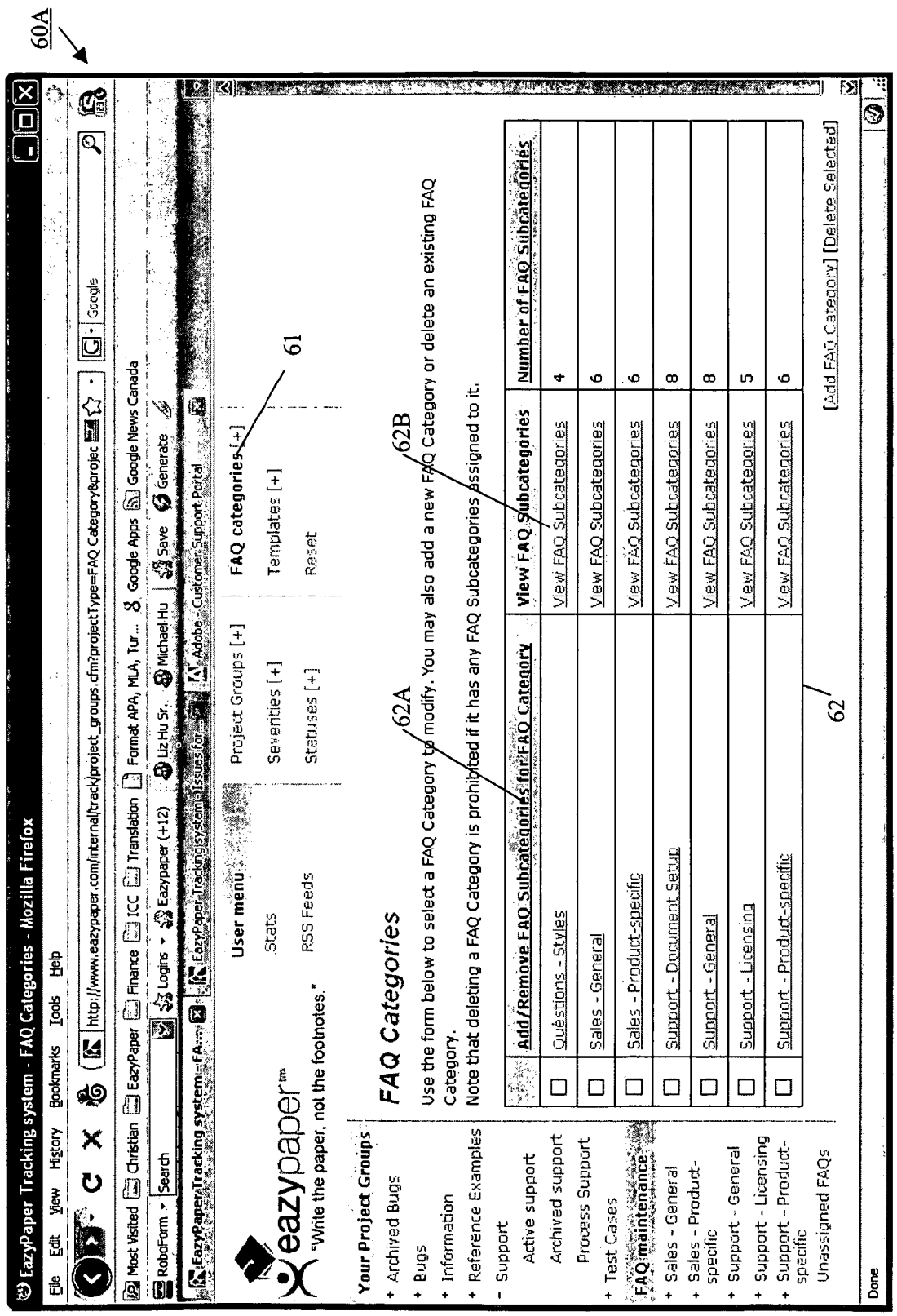
FIGS. 6A-6C illustrate a number of screens 60A-60C of the support management interface for assigning a question to a category/subcategory.
Figure 6B:
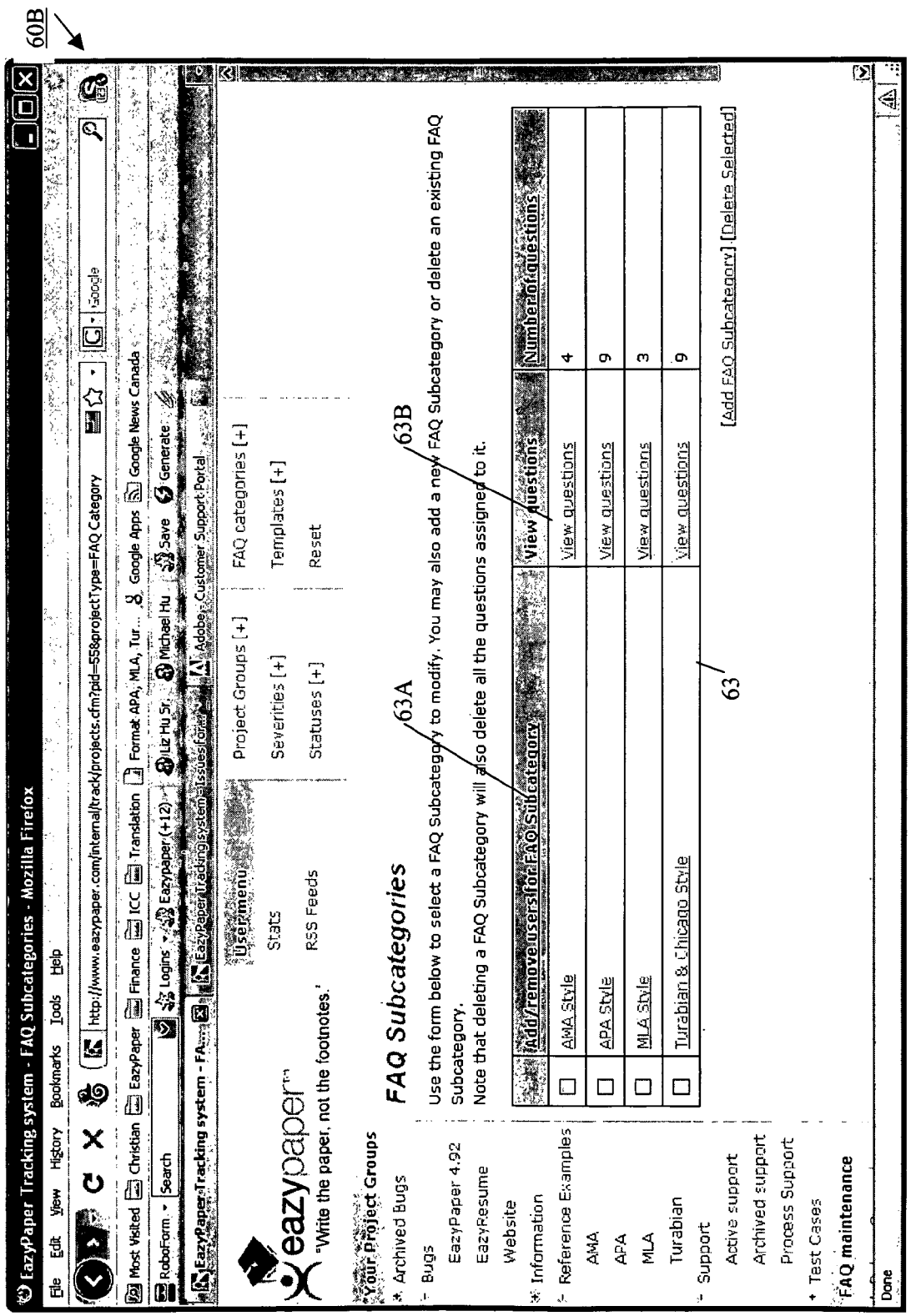
Figure 6C:
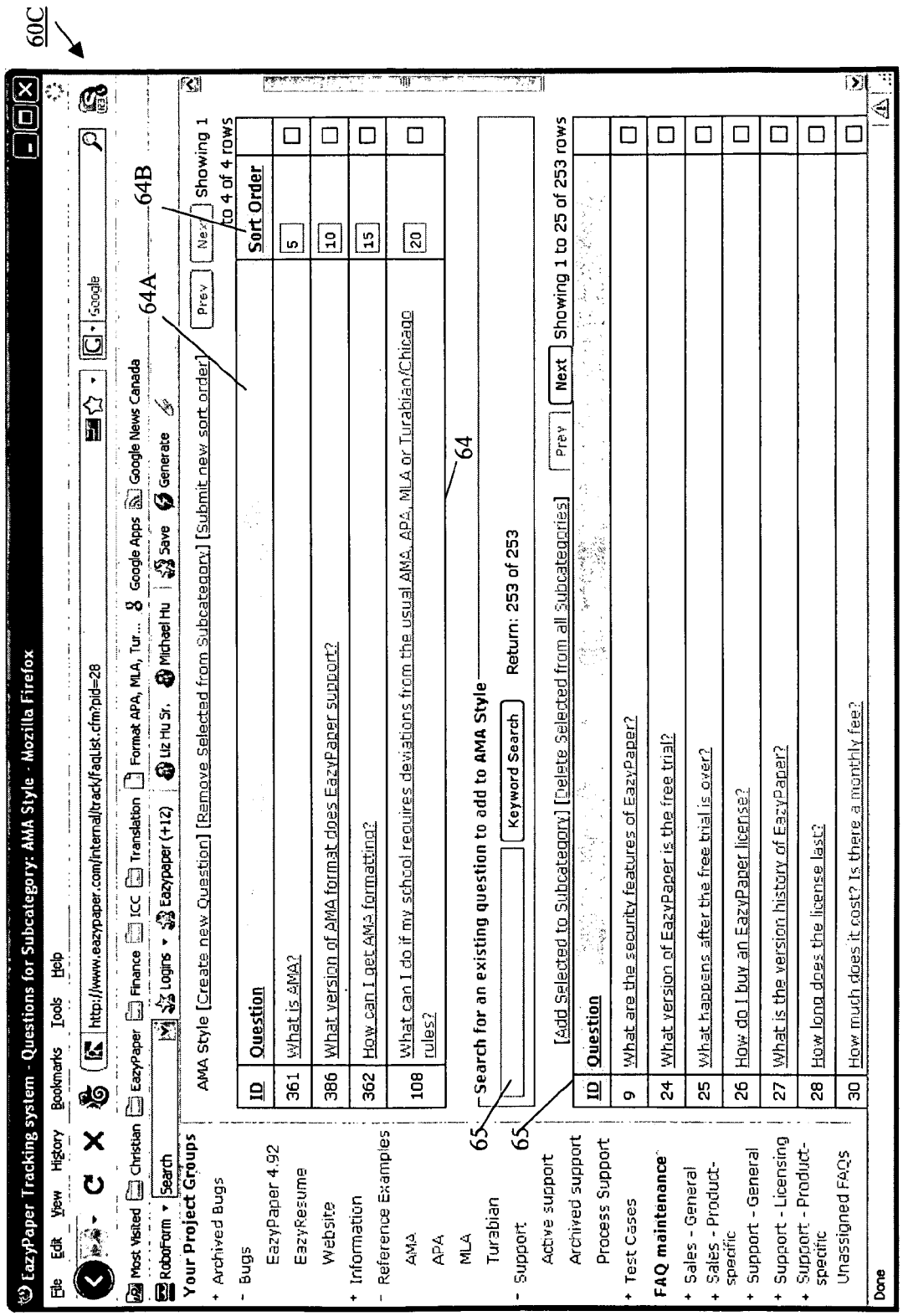

FIGS. 6A-6C illustrate a number of screens 60A-60C of the support management interface for assigning a question to a category/subcategory. As shown in FIG. 6A, when a link 61 is clicked, a category table 62 is displayed which lists a number of FAQ categories 62A. The support team member can add/delete/rename a FAQ category or add/delete/rename subcategories of a category using various interface tools provided on the screen. The category table 62 also includes a number of links 62B. When a link 62B corresponding to a category is clicked, a subcategory table 63 is display as shown in FIG. 6B which lists a number of FAQ subcategories 63A under the corresponding category. The support team member can add/delete/rename a subcategory or perform other functions using various interface tools provided on the screen. The subcategory table 63 also includes a number of links 63B. When a link 63B corresponding to a subcategory is clicked, a questions table 64 is displayed as shown in FIG. 6C which lists the questions 64A under the corresponding subcategory. The support team member can edit a question and its associated answer, remove a question from the table 64, etc. using various interface tools provided on the screen. A search field 65 and a search result table 66 are provided on this screen to allow the support team member to select a question to add to the questions of table 64. The system allows each question to be categorized under zero or more categories/subcategories. The questions table 64 also includes a sort order number for each question which will determine the order in which the questions are displayed on the public FAQ. The sort order numbers can be modified by a support team member. Any changes made by using screens 60A-60C are immediately reflected in the public FAQ visible to the public.

From the above descriptions, it can be seen that the user support system according to embodiments of the present invention integrates traditional FAQ and helpdesk systems into one unified User Interface (UI) (see FIG. 1). The UI presents the FAQ feature before the helpdesk feature (i.e. asking the user to enter a question), and thus reduces unnecessary support requests that are already answered by the FAQ. Furthermore, the user is immediately presented with an interface that allows him to generate a support request that is not yet answered by the present FAQ database. This reduces user aggravation of searching for the way to generate a support request after browsing through the FAQ.

Further, the user support system according to embodiments of the present invention automatically categories support requests by category and subcategory and thus sorts support emails for the technical support team automatically. The support management interface of the user support system integrates support request handling and FAQ maintenance and helps to keep the publicly available FAQ updated and synchronized with internal answers.

The user support system is preferably a software based support scheme, and is portable across any operating system or hardware. The preferred embodiment of the user support system is through a web interface to display the interface screen on the user's computer, but it may also be implemented as a client-server application.

The user support system described above may be employed to provide technical support for a software or hardware product, or more generally, it may be used by any organization as a part of its website for interacting with its customers or constituents. In this sense, the terms used in the above description such as "user", "vendor", "user support", "user support system", "technical support team", etc. should not be taken to limit the applications of the system and method of the present invention. The term "user" should be broadly interpreted to include any user, customer, members of an organization, constituents, or anyone who uses the support system. The term "vendor" should be broadly interpreted to include a product vendor, a contractor of the vendor, any organization that desires to communicate with its members of constituents via its website, etc., and can be generally referred to as the support provider. The term "user support" should be broadly interpreted to include any form of communicating with a user and responding to user inquires. The user questions are not limited to technical questions but may be any questions of interest to the users or the organizations providing the support system. The term "user support system" and "technical support team" should be broadly interpreted to include a system and staff that provides answers to user questions.

Although FIGS. 1 and 3-5 provide specific examples of a user interface displays and a support management interface display, the invention is not limited to the specifics of these interface displays. The invention may be implemented using any forms of interface displays, as long as the display includes input means that allows the user or support team member to enter the relevant information. The input means may be buttons, check boxes, radio buttons, text input fields, drop-down menus, pop-up menus, icons, tabs for bringing up different sheets, separate windows, etc., or combinations thereof, or any other suitable structure of allowing the user to input information to the computer. The computer software designs for suitable structures of the input means are apparent and familiar to a person of ordinary skill in this field. Therefore, detailed descriptions for these structures are omitted from here. The term "user interface display" is used to generally mean any suitable screen display that displays information to the user and/or allows the user to input commands and other information, and is not limited to any specific form of display, and may include a series of consecutive displays unless otherwise specified.

It will be apparent to those skilled in the art that various modification and variations can be made in the user support method and system of the present invention without departing from the spirit or scope of the invention. Thus, it is intended that the present invention cover modifications and variations that come within the scope of the appended claims and their equivalents.

What is claimed is:

1. A method of handling user support requests using a support management interface display, comprising:
   (a) storing a database containing a plurality of questions and a corresponding plurality of answers;
   (b) receiving a user support request from a user;
   (c) displaying on a ticket handling screen of the support management interface a list of questions retrieved from the database;
   (d) receiving a selection of one of the displayed questions from a support staff;
   (e) generating a response to the user request based on an answer stored in the database corresponding to the selected question;
   (f) communicating the response to the user;
   (g) displaying on the ticket handling screen a first input means for entering a first database maintenance request;
   (h) in response to receiving the first database maintenance request, displaying a database maintenance screen of the support management interface, the database maintenance screen including a first area displaying the question selected in step (d) and a second area displaying the corresponding answer, the second area permitting the displayed answer to be edited; and
   (i) storing the edited answer in the database as the answer corresponding to the question.

2. The method of claim 1,
   wherein in the database, at least some questions have two corresponding answers including an internal answer and a public answer, and
   wherein in step (e), the response is generated based on the corresponding internal answer if one exists, and based on the corresponding public answer if a corresponding internal answer does not exist.

3. The method of claim 1,
   wherein in the database, at least some questions have two corresponding answers including an internal answer and a public answer, and
   wherein in step (h), the second area of the database maintenance screen includes an internal answer area displaying the internal answer and a public answer area displaying the public answer, the internal answer area and the public answer area permitting the internal answer and the public answer to be edited.

4. The method of claim 3,
   wherein the internal answers contain zero or more template variables, and
   wherein in step (h), the second area of the database maintenance screen further permitting editing of template variables.

5. The method of claim 1,
   wherein the database further contains, for each question, zero or more levels of support categories to which the question is assigned, wherein step (c) includes:

(c1) displaying on the ticket handling screen one or more menu windows for selecting one or more levels of support categories, (c2) receiving a selection of one or more levels of support categories from the support staff; and (c3) retrieving from the database a list of questions assigned to the selected one or more levels of support categories and displaying them on the ticket handling screen.

6. The method of claim 1, wherein in step (b), the user support request includes a user-inputted question and one or more levels of support categories selected by the user;

wherein the method further comprises:

(j) storing statistical information associating the question selected by the support staff in step (d) with the one or more levels of support categories selected by the user in the user support request in step (b); and (k) associating a question in the database with one or more levels of support categories based on the stored statistical information.

7. The method of claim 6, wherein the ticket handling screen further displays a second input means for entering a second database maintenance request;

wherein step (k) includes:

(k1) in response to receiving the second database maintenance request, displaying one or more lists of one or more levels support categories, and displaying a list of questions;

(k2) receiving, from the support staff, a selection of one or more levels of support categories displayed in step (kl) and a selection of a question displayed in step (k2); and (k3) associating the selected question with the selected one or more levels of support categories.

8. A method of handling user support requests using a support management interface display, comprising:

(a) storing a database containing a plurality of questions and a corresponding plurality of answers, the database further containing, for each question, zero or more levels of support categories to which the question is assigned;

(b) receiving a user support request from a user, which includes a user-inputted question and one or more levels of support categories selected by the user;

(c) displaying on a ticket handling screen of the support management interface a list of questions retrieved from the database;

(d) receiving a selection of one of the displayed questions from a support staff;

(e) generating a response to the user request based on an answer stored in the database corresponding to the selected question;

(f) communicating the response to the user;

(g) storing statistical information associating the question selected by the support staff in step (d) with the one or more levels of support categories selected by the user in the user support request in step (b);

(h) displaying on the ticket handling screen an input means for entering a database maintenance request;

(i) in response to receiving the database maintenance request, displaying one or more lists of one or more levels support categories and a list of questions;

(j) receiving, from the support staff, a selection of one or more levels of support categories displayed in step (i) and a selection of a question displayed in step (i); and (k) associating the selected question with the selected one or more levels of support categories.

* * * * *